United States Patent [19]
Funk

[11] 3,891,859
[45] June 24, 1975

[54] PULSED, VARIABLE BEAM PATTERN OPTICAL MEASURING DEVICE

[75] Inventor: Clarence J. Funk, San Diego, Calif.

[73] Assignee: The United States of America as represented by the Secretary of the Navy, Washington, D.C.

[22] Filed: June 21, 1974

[21] Appl. No.: 481,589

[52] U.S. Cl. ............... 250/564; 250/565; 250/574; 250/232; 356/103
[51] Int. Cl.² ............................................. G01N 21/28
[58] Field of Search ........... 250/564, 565, 573, 574, 250/575, 234, 232; 356/103, 104, 201; 235/151.3

[56] References Cited
UNITED STATES PATENTS

| | | | |
|---|---|---|---|
| 3,417,251 | 12/1968 | Leonard et al. | 356/103 X |
| 3,619,624 | 11/1971 | Sorenson | 356/103 X |
| 3,672,781 | 6/1972 | Rosenblum | 250/575 X |
| 3,703,337 | 11/1972 | Neugroschel et al. | 250/564 X |
| 3,782,824 | 1/1974 | Stoliar et al. | 356/201 X |

OTHER PUBLICATIONS

Funk: Applied Optics; 2/73; Vol. 12, No. 2, pp. 301–313.

*Primary Examiner*—Walter Stolwein
*Attorney, Agent, or Firm*—Richard S. Sciascia; Ervin F. Johnston; William T. Skeer

[57] ABSTRACT

An apparatus and method for obtaining simultaneous measurements of the basic optical properties of seawater employs a pulsed beam of monochromatic light together with a variable focal length optic system to illuminate a predetermined volume of ambient fluid. A detection system measures the time decay of light energy returned from this volume and computes in real time the volume scattering function, total attenuation coefficient, the absorption coefficient and scattering coefficient of the volume.

21 Claims, 5 Drawing Figures

PULSED, VARIABLE BEAM PATTERN OPTICAL MEASURING DEVICE

STATEMENT OF GOVERNMENT INTEREST

The invention described herein may be manufactured and used by or for the Government of the United States of America for governmental purposes without the payment of any royalties thereon or therefor.

FIELD OF THE INVENTION

This invention pertains to the field of oceanographic instrumentation. More particularly, this invention pertains to photoelectric measurements of the optical properties of seawater. In still greater particularity, but without limitation thereto, this invention pertains to measurement of the optical properties of an underwater environment or the use of a pulsed beam of laser energy.

DESCRIPTION OF THE PRIOR ART

Modern oceanographic techniques involve frequent measurements and optical reconnaissance of the underwater environment. Such measurements depend ultimately on the interaction of the ocean environment with optical energy. For example, great strides have been made in enhancing photographic data by means of special signal processing techniques. Of course, such signal processing enhancement depends on the precise knowledge of the underwater optical properties at the time of the data gathering.

In the past, information about the optical properties has been obtained by a series of measurements of similar environments and of the desired environment at times different than that at which the photographic information was obtained. Accordingly, a great limitation in obtaining accurate optical information on which to apply the improved signal processing techniques has resulted.

Additionally, prior art systems do not provide measurements of the basic optical properties at the same time. Therefore, when taken from a moving platform, such as an oceanographic research ship, a lack of time-spatially related data hinders effective use of the measured data.

The deficiencies of the prior art can be largely traced to the nature of the optical instrumentation used to obtain these values. That is, in the past, water characteristics have been measured with separate instruments such as a transmissometers, nephelometrs, small-angle forward-scattering meters, and absorption meters. Such instruments are well understood in the optics and oceanographic arts and their methods of use and limitations are adequately covered in standard works on the subject, therefore, they will not be discussed in greater detail herein.

SUMMARY OF THE INVENTION

This invention employs a monochromatic light source together with appropriate light valves and a filtering means to establish a beam of monochromatic energy. This energy is focused into a predetermined conical volume by means of a variable focal length optical system. Light reflected from this illuminated volume is processed through a variable focal length optical system, and converted to an electrical analog which is then processed by general purpose computer to obtain the desired optical properties.

STATEMENT OF THE OBJECTS OF THE INVENTION

It is accordingly an object of this invention to provide an improved optical, oceanographic instrumentation system.

A further object of this invention is the provision of oceanographic instrumentation system which measures the basic properties of seawater in a spatial and time relationship.

Yet another object of this invention adds the provision of an optical system to be used in obtaining oceanographic information simultaneous with other optical and oceanographic measurement activities.

More particularly, another object of this invention is the provision of an oceanographic instrumentation which obtains volume scattering function, total attenuation coefficient, the absorption coefficient, and a scattering coefficient of seawater.

These and other objects of the invention will become more readily apparent from the ensuing specification when taken together with the appended claims and drawings.

DESCRIPTION OF THE PREFERRED EMBODIMENT

Figure 1:
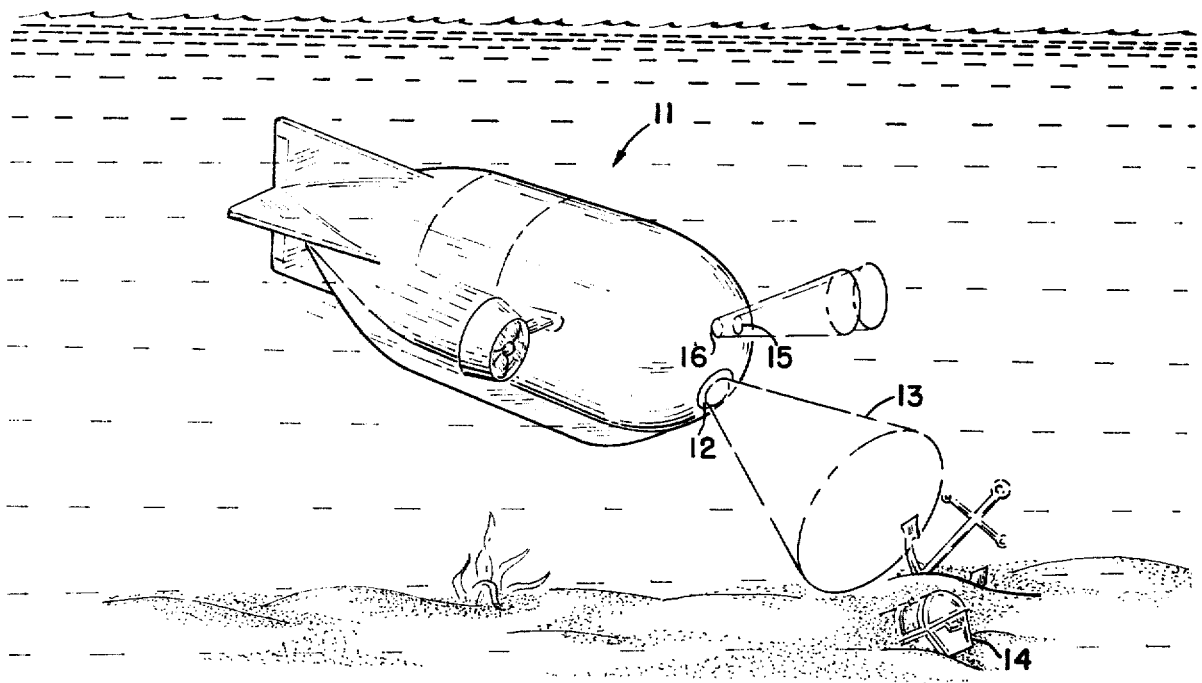
FIG. 1 is a perspective view of the invention in its operational environment.

Referring to FIG. 1, an underwater vehicle 11 is shown investigating an area of the ocean floor. Underwater vehicle 11 may be a remotely controlled or manned vehicle. As is well understood in the oceanographic instrumentation arts, the remotely controlled vehicles may be either of the free-swimming or tethered type.

At the forward end of vehicle 11, an optical port 12 permits photographic, visual, or other optical examination of an area forward of vehicle 11. This area is indicated by a cone 13 outlined in broken line segments.

Two smaller ports 15 and 16 are positioned above port 12 and permit simultaneous light transmission and reception into nearby conic volumes. It is through these two smaller ports that the optical system of the invention is focused to provide basic measurements of the optical properties of the seawater adjacent vehicle 11. Ports 15 and 16 may be considered the forward elements of variable focal length optical systems to be described.

Figure 2:
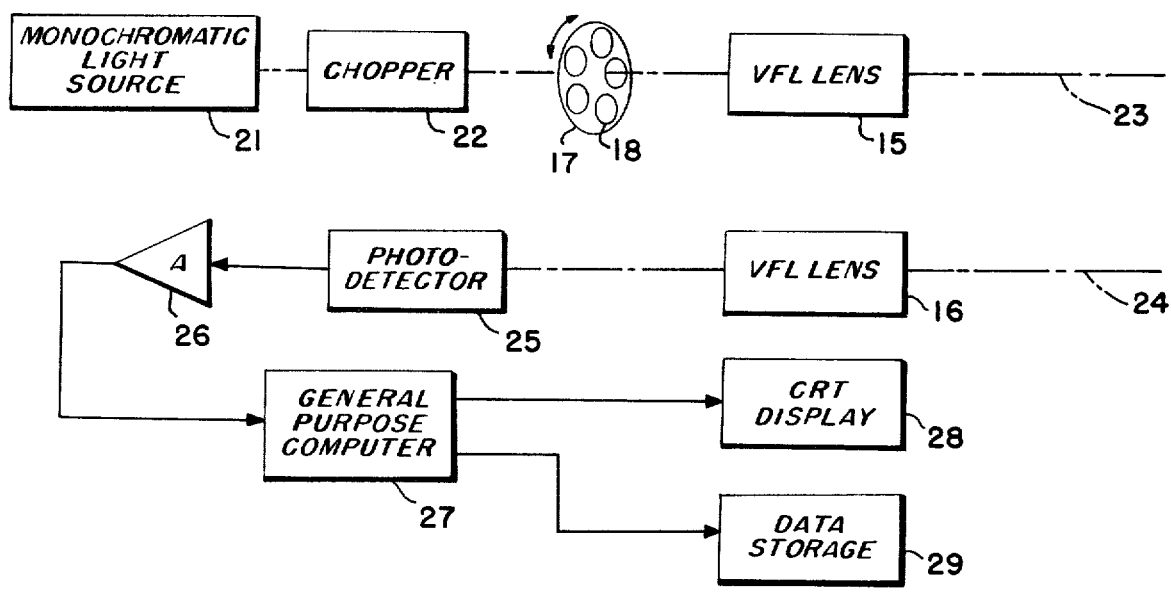
FIG. 2 is a diagrammatic representation of the elements of the invention.

Referring to FIG. 2, a monochromatic light source 21 is shown being pulled by a chopper 22. In practice, monochromatic light source 21 comprises a quasi-monochromatic light generator such as a xenon ion laser.

Chopper 22 may be any suitable light valve structure capable of handling the optical power and chromatic properties of monochromatic light source 21. In practice, it has been found convenient to incorporate the light valve structure of chopper 22 into the quasi-monochromatic light source 21 as will be presently described. A filter wheel 17 carries a plurality of transmission filters 18 and selectively positions one of said filters in optical axis 23 which extends from monochromatic light source 21 through the variable focal length lens, or other optical system 15. Light returning from the illuminated volume travels along closely spaced optical axis 24 through a variable focal length lens 16, previously noted as being in the forward portion of vehicle 11, and impinges a photodetector 25.

Photodetector 25 produces an electrical analog of the light returned for subsequent data processing. Photodetector 25 may be, for example, a photo-transistor or, alternatively, a photomultiplier tube. Of course, the choice between various photodetectors 25 will depend on the anticipated range of absorption figures to be encountered and the optical power of monochromatic light source 21.

The output of photodetector 25 is connected to a suitable amplifier 26 which serves to amplify the output signal to a value to be handled by general purpose computer 27, to which it is connected. Further, amplifier 26 may conveniently serve as impedance matching device as is well understood in the electronic circuitry arts. General purpose computer 27 may be of any appropriate type which may be programmed to handle the algorithms to be further described herein and may, as the name indicates, be used for other instrumentation and shipboard purposes. General purpose computer 27 determines the decay rate of the power of the received light energy and displays this rate on cathode ray tube display 28 as well as places it in a conventional magnetic storage medium as indicated at the 29 for further processing. Of course, cathode ray tube 28 as well as data storage 29 and general purpose computer 27 may be located at a remote point from the previously described equipment, particularly in the case of remotely controlled vehicles.

Figure 3:
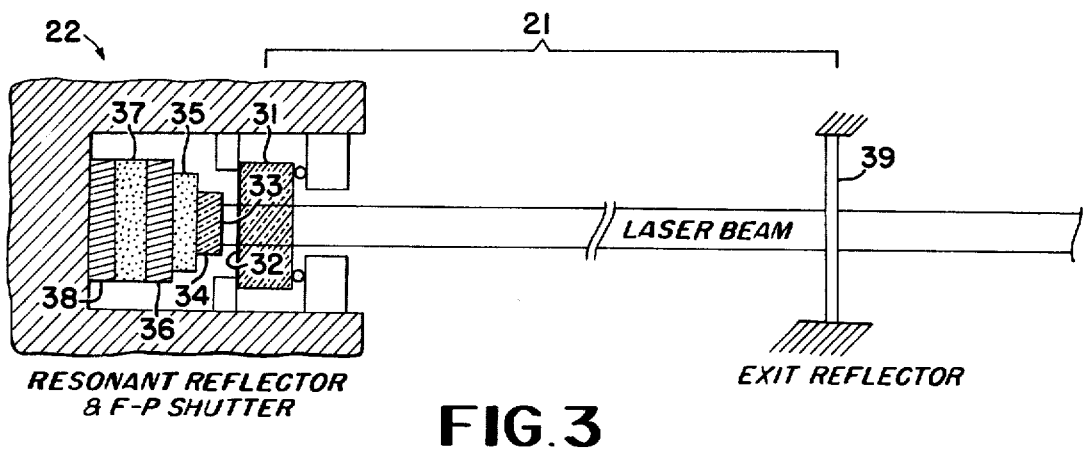
FIG. 3 is a sectional view of the chopper element of the invention.

Referring to FIG. 3, a construction alluded to previously in the description of FIG. 3 will be described in greater detail. In this arrangement, a light valve 22 is formed integrally with the quasi-monochromatic light source generator 21. The portion of the construction indicated by the bracket 21 is a conventional gas laser having an exit reflector 39. The resonant reflector structure is comprised by a pair of dielectric mirrors 32 and 33. Dielectric mirror 32 is mounted on the rear face of a planeoparallel transparent block 31 which is rigidly mounted with respect to the laser body. Dielectric reflector 33 is mounted on the front face of an optical flat block 34 which, in turn, is mounted on a piezoelectric element 35. By electrically driving piezoelectric element 35, reflector 33 may be moved through a quarter wave length to change the combined reflectivity of reflectors 32 and 33.

In order to more accurately position reflector 33, piezoelectric element 35 and optical flat 34 may be positioned by a similar piezoelectric system which is operated with static voltages to obtain accurate placement. This positioning assembly is illustrated as comprising a mounting block 36, a second piezoelectric element 37, and a mounting block 38, which is secured to the body of the laser. By electrically activating piezoelectric element 37, piezoelectric element 35 together with optical flat 34, may be moved longitudinally to position dielectric reflector 33 in its critical position with respect to reflector 32.

Figure 4:
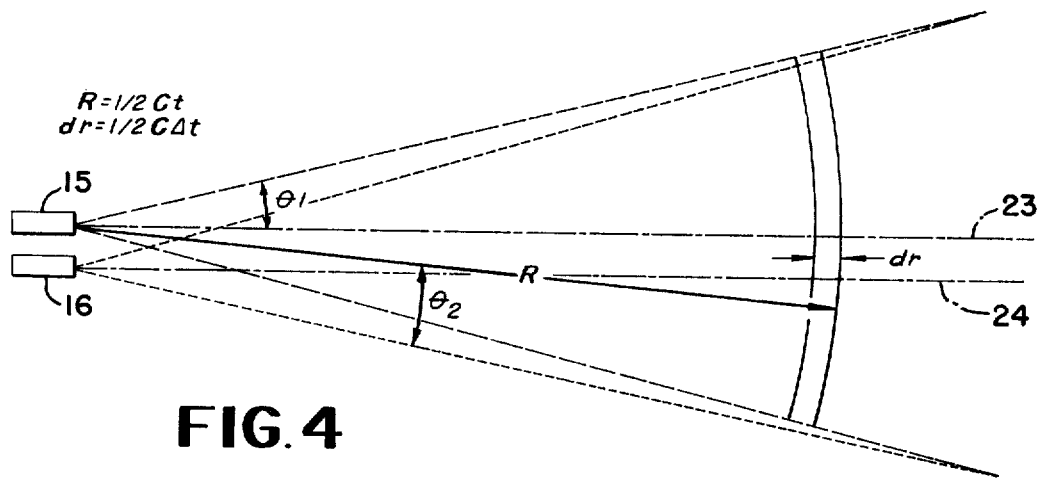
FIG. 4 is a diagrammatic representation of certain aspects of the operational parameters of the invention useful in understanding the mathematical relationships thereof.

Referring to FIG. 4, the basic optical diagram of the environmental grounds is illustrated. A pulse of optical energy having a length indicated at DR emanates from projection optics 15 along an optical axis 23. The optical parameters of the projecting optics 15 determines a half-angle, indicated at $\theta_1$ which represents the optical dispersion of the energy into the ambient water. Light energy returns from this illuminated arc along an optical axis 24 to be received by suitable objective optics 16. The optical focal length of the objective 16 determines a half-angle of acceptance, $\theta_2$. By positioning lenses 15 and 16 in close proximity, the separation of optical axis 23 and 24 may be minimized. Similarly, by careful adjustment of the relative focal length of lenses 15 and 16 reception of essentially all of the light energy returned from the illuminated volume may be obtained.

As will be well understood by those familiar with the optical instrumentation arts, aside from the geometry of the aforedescribed optical system, i.e. the field of view of the receiver and the angular extent of the beam pattern of the source, the power of the returned pulse will be dependent upon the basic optical properties of the fluid medium, that is, the scattering function, $\sigma(\theta)$, the total attenuation coefficient, $\infty$ ($\lambda$), the absorption coefficient, $a(\lambda)$, and the scattering coefficient $s(\lambda)$.

Thus, by measuring a set of effective coefficients for a corresponding set of different systems of geometries in a given sample, these basic optical properties of the sample can be determined. The relationship between the effective attenuation coefficient and the basic optical properties of the water can be calculated using Monte Carlo techniques. This technique is more completely set forth and will be better understood by reference to the article "Multiple Scattering Calculations of Light Propagation in Ocean Water", by Clarence J. Funk which appeared in *Applied Optics*, Volume 12, page 301, February 1973.

In detail, the power of the backscattered light from a narrow pulse of quasi-monochromatic radiation is given by:

$$P_b(t) = \frac{9\,\sigma(\pi)\,A_0\,\lambda}{16} \int_{R(t)-\frac{1}{2}C_\omega \Delta T}^{R(t)} \frac{W(\lambda i, c\omega T - 2r)\exp[-(c_1+c_3)r]dr}{r^2}$$

Where:
 $A_0$ is the area of the entrance pupil of the receiving optics,
 $W(\lambda i,t)$ is a power emitted by the monochromatic light source,
 $C_1$ is the effective attenuation coefficient of the light traveling between the source and the backscattering volume element,
 $C_3$ is the effective attenuation coefficient of the light traveling between the backscatter volume element and the receiver, and $C_\omega$ is the velocity of the light in water, and $\Delta \tau$ is the duration of the light pulse.

For a square light pulse, this equation can be simplified to:

$$P_b(t) = \frac{9\gamma A\omega(\pi)\, W_0(\lambda i)}{16} \left\{ \frac{E_2[\,(C_1+C_3)R(t)\,]}{R(t)} - \frac{E_2\{(C_1+C_3)(R(t)-\tfrac{1}{2}c\omega\Delta t)\}}{R(t)-\tfrac{1}{2}C\omega\Delta t} \right\} \bigg|_{R(t)=\tfrac{1}{2}C\omega t}$$

Where:
$E_2(X)$ is the exponential function of the order 2. The temporal dependence of the received and back-scattered light is given by the function:

$$(\gamma,t) = R^2 \left\{ \frac{E_2(\gamma R)}{R} - \frac{E_2\{\gamma(R-\tfrac{1}{2}C\omega\Delta t)\}}{R-\tfrac{1}{2}C\omega\Delta t} \right\}$$

and this is the function measured by the photodetector 25 and is plotted in FIG. 4 for pulses having a duration of 20 nanoseconds. The slope of these curves is an accurate measurement of the attenuation of the transmission path and return path indicated as $\gamma$.

Therefore, it may be seen that the invention obtains a measurement of the sum of the effective attenuation coefficients by measuring the exponential decay rate of the received backscattered value. When the half angle of the receivers field is equal to the half angle of the beam pattern of the source, one may show that C1 equaled C3, equals $\gamma$ divided by 2.

As an alternative to the Monte Carlo processing technique described above, the approximation developed by Dr. Alan Gordon, "Underwater Multiple Scattering of Light for System Designers", *Naval Undersea Center Tech Note* 861, San Diego, Calif., 1972 may be used. This approximation known as the Gordon Approximation shows that:

$$C_1 = \alpha - s \cdot F(2\theta_1),$$

Where:

$$F(2\theta_1) = \frac{2\pi}{\sigma} \int_0^{2\theta_1} \sigma(\theta)\sin(\theta)d\theta,$$

and $\theta$ 1 is the half-angle of the beam pattern of the source.

Thus, if the volume scattering function of the water is known, the values of $\infty$ ($\lambda$) and $a$ ($\lambda$) can be obtained by using two different beam patterns. That is, the variable focal length optics of lenses 15 and 16 may be adjusted slightly and the results solved according to the following equations.

$$s(\lambda) = \frac{C_1(\lambda) - C_1'(\lambda)}{F(2\theta_1') - F(2\theta_1)},$$

$$\infty(\lambda) = \frac{C_1(\lambda)F(2\theta_1') - C_1'(\lambda)F(2\theta_1)}{F(2\theta_1') - F(2\theta_1)}$$

and $\quad a(\lambda) = \infty(\lambda) - s(\lambda).$

If the value of $\infty$ ($\lambda$) is known for the sample of water, and a series of effective attenuation coefficients are measured for different beam patterns of the source, then the volume scattering function may be obtained by numerically differentiating the series of functions:

$$s(\lambda) F(2\theta_1) = \infty(\lambda) - C_1(\lambda) = 2\pi \int_0^{2\theta_1} \sigma(\theta)\sin(\theta)d\theta,$$

$$s(\lambda) F(2\theta_1') = \infty(\lambda) - C_1'(\lambda) = 2\pi \int_0^{2\theta_1'} \sigma(\theta)\sin(\theta)d\theta,$$
etc.

Of course, a spectrally sensitive transmissometer of conventional design may be used to obtain $\infty$ ($\lambda$) using the light output from monochromatic light source 21. Of course, those versed in the optical arts may make appropriate substiutions of equipment for that described to measure it with the well understood trade-office in accuracy, cost, and weight. For example, a Pockells cell may be used to shutter a spectrally filtered conventional light source to produce the irradiating energy. Similarly, a single variable focal length lens might be used in combination with the beam splitter to ensure absolute congruence. A variety of general purpose computers may be used for general purpose computer 27 for example, the AN/UYK 7 series of computers as well as AN/USQ-20 series of computers, both commonly used on shipboard, have proven satisfactory in solving the above expressions. Choices as between these various units would, as noted above, be dependent upon other purposes for which they are employed, in the particular oceanographic system.

MODE OF OPERATION

Figure 5:
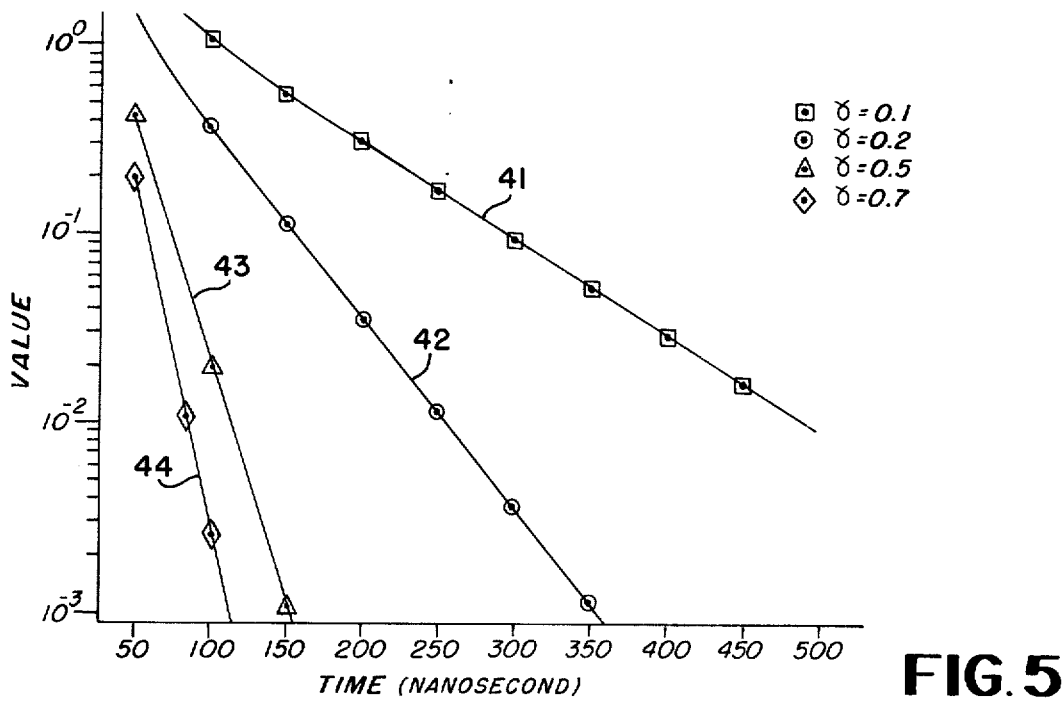
FIG. 5 is a graphic representation of the data obtained in the practice of the invention.

The mode of operation of the invention is essentially the mode of operation of the individual components. That is, each of the individual components function in the aforedescribed fashion to project a beam of monochromatic light into a predetermined body of fluid, to receive light energy returned from said predetermined body of fluid and the generation of the electric analog thereof. Each of a series of measurements is recorded as indicated in FIG. 5, to produce a plurality of curves, indicated at 41, 42, 43, and 44 which correspond to a $\gamma$ of 0.1, 0.2, 0.5, and 0.7, respectively. This information is then stored, as previously discussed, and used in subsequent evaluation of other optical information obtained during the period of the measurements.

The foregoing description, taken together with the appended claims constitute a disclosure such as to enable a person skilled in the electronic and oceanographic arts and having the benefit of the teachings contained therein to make and use the invention. Further the structure herein described meets the objects of invention and generally constitutes a meritorious advance in the art unobvious to such a worker not having the benefit of these teachings.

Obviously, many modifications and variations of the present invention are possible in the light of the above teachings, and, it is therefore understood that within the scope of the disclosed inventive concept, the invention may be practiced otherwise than specifically described.

What is claimed is:
1. A measuring system for determining the optical properties of a body of fluid comprising:
   a quasi-monochromatic light source;
   light valve means operatively associated with said quasi-monochromatic light source for controlling the output thereof;
   variable focal length projection optics operatively positioned with respect to said quasi-monochromatic light source for receiving the controlled output thereof and for directing the con- trolled output into a predetermined volume of said body of fluid;

variable focal length objective optics operatively positioned with respect to said variable focal length projection optics for receiving light returned from said predetermined volume of said body of fluid;

photodetector means positioned behind said variable focal length objective optics means in the focal plane thereof for developing an electrical analog of the intensity of the light returned from said predetermined volume of said body of fluid; and a general purpose computer effectively connected to said photo detector means and operatively programmed to determine the decay rates of the analogs of the intensities of the light returned from said predetermined volume of said body of fluid.

2. A measuring system according to claim 1 in which said quasi-monochromatic light source includes means for selectively limiting the light output from said quasi-monochromatic light source to essentially a single wave length.

3. A measuring system according to claim 2 in which said selecting means includes a plurality of transmission filters which are mounted so as to be selectively inserted into the light outputs of said quasi-monochromatic light source.

4. A measuring system according to claim 1 wherein said quasi-monochromatic light source includes a xenon ion laser.

5. A measuring system according to claim 3 wherein said quasi-monochromatic light source includes a carbon dioxide laser.

6. A measuring system according to claim 1 further including a cathode ray tube display connected to said general purpose computer to provide a visual display of the decay rates determined thereby.

7. A measuring system according to claim 5 further including a cathode ray tube display connected to said general purpose computer to provide a visual display of the decay rates determined thereby.

8. A measuring system according to claim 1 wherein said light valve means includes a Fabry-Perot interferometer.

9. A measuring system according to claim 7 wherein said light valve means includes a Fabry-Perot interferometer.

10. A measuring system according to claim 8 in which said Fabry-Perot interferometer is a component part of the aforesaid quasi-monochromatic light source.

11. A measuring system according to claim 9 in which said Fabry-Perot interferometer is a component part of the aforesaid carbon dioxide laser.

12. A method of measuring optical properties of a body of fluid comprising in sequence the steps of:

generating a beam of quasi-monochromatic light energy;

directing said beam of quasi-monochromatic energy into said body of fluid in a predetermined angular divergence;

pulsing said beam of quasi-monochromatic light into a plurality of time separated pulses;

receiving the pulsed light returned from said body of fluid;

converting said received pulsed light into electrical analogs thereof;

sensing the electrical analogs of the pulsed light analog signals at predetermined time intervals between pulses;

repeating said previous five steps for other predetermined angular divergences;

measuring the exponential decay rate of the power of the returned pulses; converting the measured data to the basic optical properties of said body of fluid; and storing said calculated data for further analysis.

13. A method according to claim 12 wherein said step of generating a beam quasi-monochromatic light further includes the step of filtering said light beam to essentially a single wavelength.

14. A method according to claim 12 wherein said step of directing said beam of quasi-monochromatic includes adjusting the focal length of projection optics to produce the desired angular dispersion.

15. A method according to claim 13 wherein said step of directing said beam of quasi-monochromatic includes adjusting the focal length of projection optics to produce the desired angular dispersion.

16. A method according to claim 12 in which said step of pulsing said beam of quasi-monochromatic light includes driving a reflection Fabry-Perot interferometer at the desired pulse rate.

17. A method according to claim 15 in which said step of pulsing said beam of quasi-monochromatic light includes driving a reflection Fabry-Perot interferometer at the desired pulse rate.

18. A method according to claim 12 in which the step of converting the measured data uses Monte Carlo processing techniques.

19. A method according to claim 17 in which the step of converting the measured data uses Monte Carlo processing techniques.

20. A method according to claim 12 in which the step of converting the measured data uses the Gordon approximation processing techniques.

21. A method according to claim 17 in which the step of converting the measured data uses the Gordon approximation processing techniques.

* * * * *